G. F. GREENWOOD.
PRODUCTION OF LEAD.
APPLICATION FILED JULY 23, 1918.
1,338,440.
Patented Apr. 27, 1920.
2 SHEETS—SHEET 2.
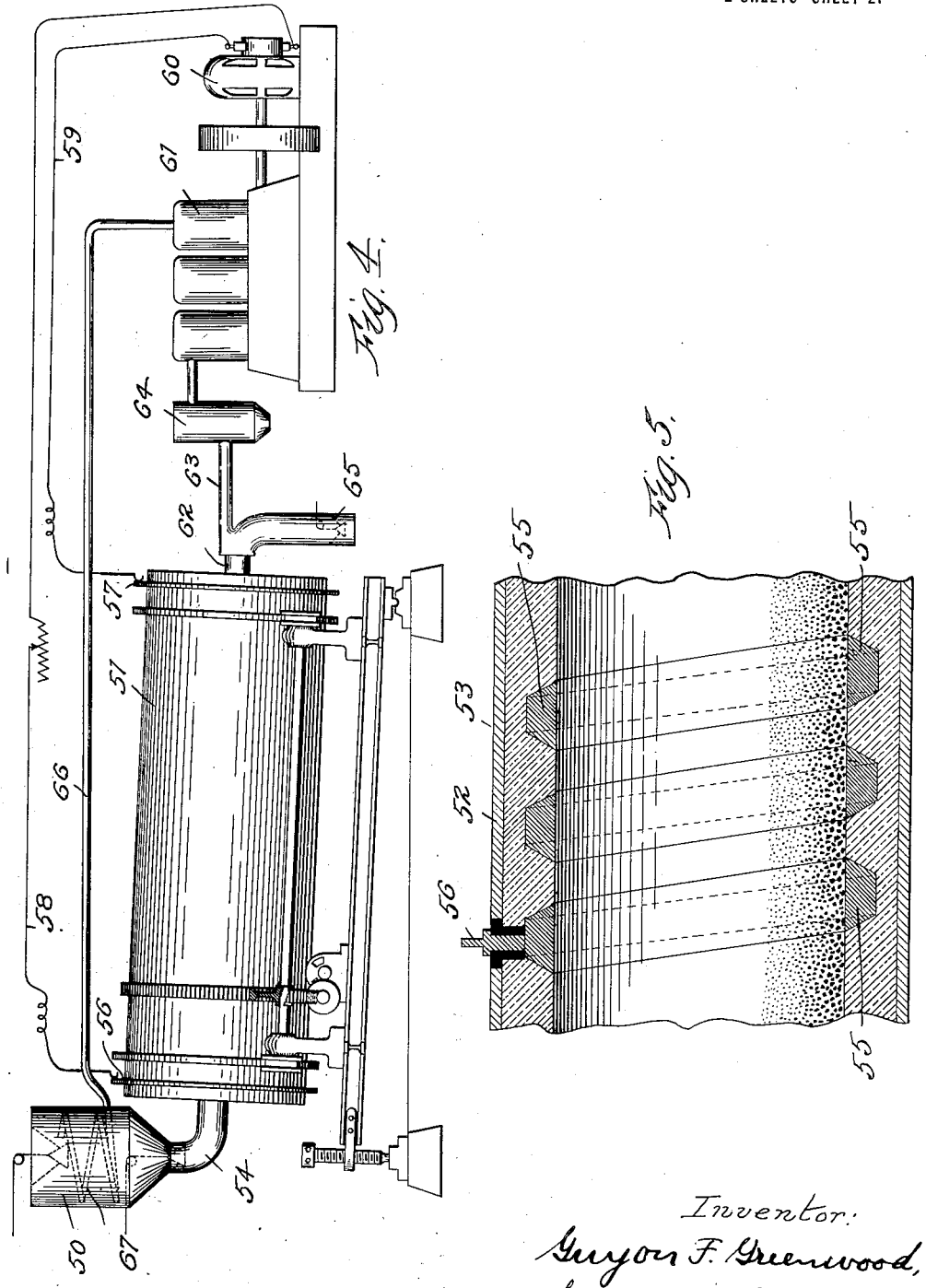

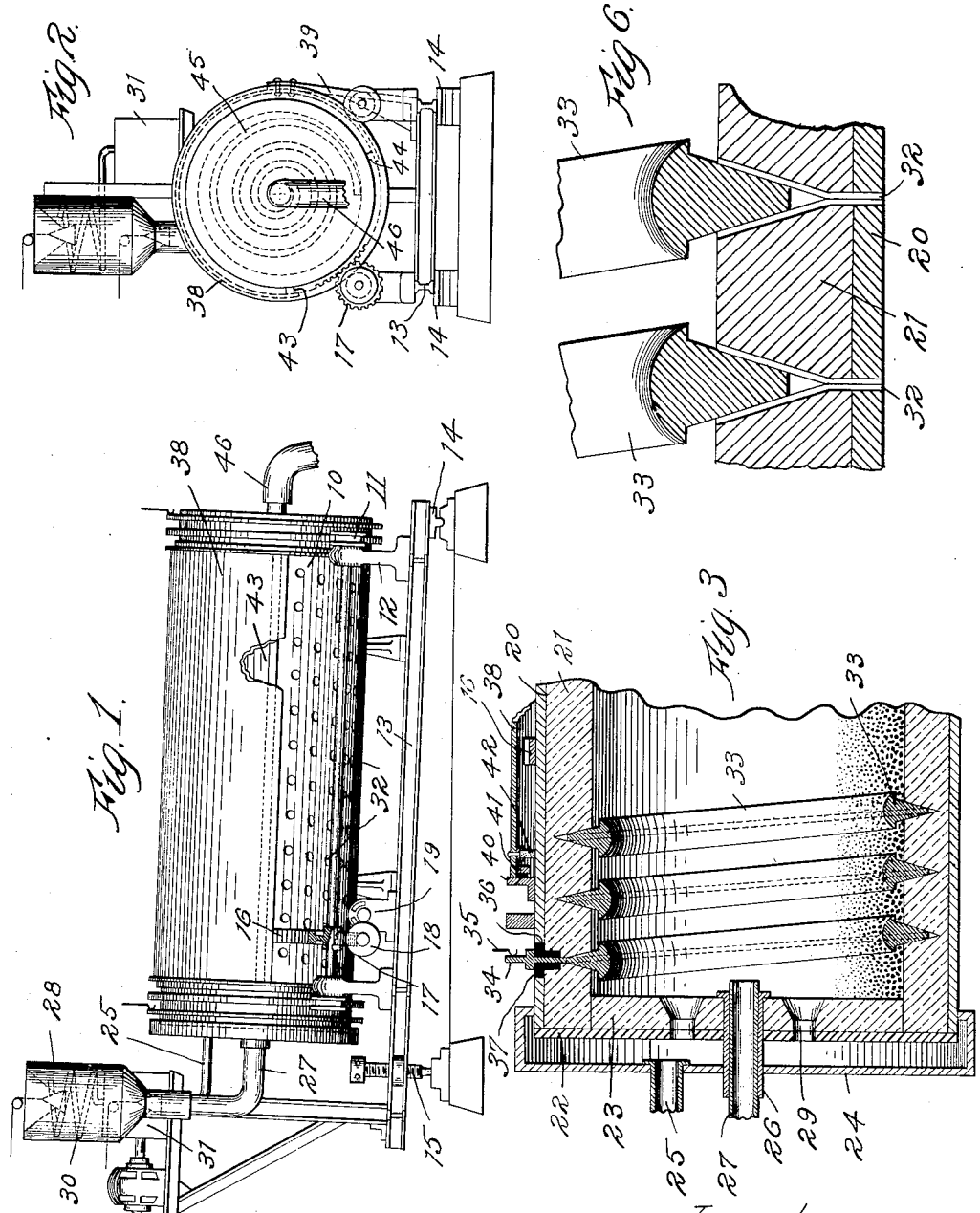

UNITED STATES PATENT OFFICE.

GUYON F. GREENWOOD, OF GEORGEVILLE, QUEBEC, CANADA.

PRODUCTION OF LEAD.

1,338,440.   Specification of Letters Patent.   Patented Apr. 27, 1920.

Application filed July 23, 1918. Serial No. 246,318.

*To all whom it may concern:*

Be it known that I, GUYON F. GREENWOOD, a citizen of the Dominion of Canada, residing at Georgeville, Province of Quebec, Canada, have invented certain new and useful Improvements in the Production of Lead, of which the following is a full and clear specification.

My invention relates to electrometallurgical operations, such as the roasting of ores and the production of metal therefrom, and is particularly directed to a simple chemical method for the production of high grade lead from ores, such as, for example, the common galena or lead sulfid ores. The process involves the preliminary roasting of the sulfid ore to produce the oxid of lead, and the subsequent reduction of the oxid to metallic form, the temperature being under control of electrical heat generating elements, whereby accurate temperature adjustments are easily attained. As an important feature of commercial economy the power for electrical heating is generated from the combustion of the gases coming from the reduction furnace, the generation of these gases being carefully regulated so as to provide substantially carbonic oxid free from the carbon dioxid and nitrogen which, under ordinary practice, are so largely present in the gases coming from metallurgical reduction furnaces. The present application is, in a way, related in subject matter to that disclosed in my application filed July 19, 1918, under Serial No. 245,692 entitled Metallurgical method and apparatus and constitutes in some of its features a specific embodiment of the broad principle therein contained. In other respects the present application involves an improved procedure for the roasting of sulfid and analogous compounds of metals, as will appear more clearly from a detailed description of one embodiment of the invention, which is illustrated in the accompanying drawing.

In said drawing,

Figure 1 represents a side elevation of a roasting furnace embodying the invention;

Fig. 2 is an end elevation thereof;

Fig. 3 is a fragmentary central longitudinal section showing the interior construction of the roasting drum;

Fig. 4 is a side elevation of the reduction drum of the power generating plant, operated by the furnace gases, and Fig. 5 is a fragmentary central longitudinal section illustrating the interior construction of the reduction drum.

Fig. 6 is a detail of the lining brick structure for providing the air passages.

It will be understood that the process involves, in a general way, the roasting of lead sulfid to form oxid in accordance with the equation:

(1) $PbS + 3-O = PbO + SO_2$ 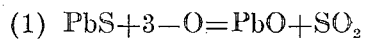

The reduction of the lead oxid is in accordance with the equation:

(2) $PbO + C = Pb + CO$ 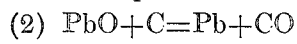

The $SO_2$ of the roasting operation may represent a waste gas discharged from the system after giving up its heat to preheating the ore, but preserved and later to be used to make sulfuric acid and for other purposes, whereas the carbonic oxid of the second reaction represents a gaseous fuel to be employed in an internal combustion engine for driving an electric generator and its composition follows the equation:

(3) $CO + O = CO_2$ 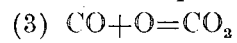

Before describing, in detail, the apparatus, in which these three reactions are conducted, it will perhaps clarify the general plan to point out the chemical heat units involved in the entire system. This may be tabulated as follows:

*Heat balance at 0° temperature.*

| | |
|---|---:|
| (1) Decomposition PbS | −20200 |
| Formation PbO | 50800 |
| Formation $SO_2$ | 69260 |
| Surplus | 99860 |
| (2) Decomposition PbO | −50800 |
| | 29160 |
| | −21640 |
| (3) CO to $CO_2$ | 68040 |

Referring now more specifically to the drawing, 10 indicates a rotary drum mounted on the usual rollers 11, supported in brackets 12 on beams 13, which are journaled at one end on blocks 14 and at the other end supported on adjustable screws or bolts 15, by which latter elements the inclination of the drum is determined. The drum is rotated by any suitable means as, for example, the gear collar 16, surrounding the drum, the pinion 17 and worm drive 18, operated by electric motor 19. The roasting drum 10 is constructed with the usual sheet metal casing 20, lined with burnt magnesia or magnesite brick 21. The ends of the drum are closed by metal plates or disks 22 lined with burnt magnesia or magnesite brick 23. The rotary drum thus constituted is provided at its upper intake end with a stationary header or casing 24, through which a gas passage 25 leads from the chamber between the header and drum end for drawing off the $SO_2$ gas, as will be described. An extended bushing or sleeve 26 is mounted axially in the end of drum 10 to rotate therewith and passing through the header 24 journals on a stationary pipe or conduit 27, through which the prepared ore is introduced into the drum from a supply hopper 28, as will be clear from Figs. 1 and 3. The chamber between header 24 and the drum end is in communication with the interior of the drum by way of ports 29, formed in the end wall of the drum, so that $SO_2$ gases developed in the roasting operation are drawn through these ports and the chamber and through pipe 25 and pre-heater coils 30 diagrammatically shown as located in the ore hopper 28, for pre-heating the ore. (See Figs. 1 and 2). This gas is constantly withdrawn from the drum 10 through the passageways described, by means of the motor driven pump 31.

The roasting of the ore within the drum 10 is to be accomplished by admitting air through the ore while maintaining the ore at suitable temperature under the control of electrical heating means. For this purpose the drum is provided with peripheral air admitting ports 32 and, in the specific example shown, a heating coil, in the form of a resister 33, is mounted in the lining of the furnace to be traversed by the ore in its passage therethrough. This resister 33 is connected at its two ends with slip rings 34, mounted on the drum 20 and engaged by brushes 35 by which the electrical connections with the resister are made through conductors 36, mounted in insulation bushings 37. The outer periphery of the resister is in the form of a fin or rib, which is seated in the brick work 21 and extends spirally around the drum lining on the line where the air passages or ports 32 are disposed, the air entering the drum through radial grooves in the brick work around the resister turns or coils and being deflected by flanges projecting laterally along the two edges of the resister. The ore fed through the roasting drum advances in a thin layer along the bottom during the rotation of the drum and an important feature of the invention resides in the provision of a stationary shield or cover mounted around a considerable portion of the drum's periphery to close off the air ports 32, except in that portion of the circumference where these ports are covered with the ore being roasted. Such a screen is shown by way of example at 38, as supported from suitable frame pieces 39, (see Fig. 2) and extending around over the top of the drum. Angle iron rings 40 are mounted to rotate with the drum near the ends of the shield and these may, for example, be provided with anti-friction rollers 41 to assist in maintaining the proper relation of the shield 38 with the drum. The space between the shield and drum is closed off at each end by asbestos packing or the like 42, which forms a sliding contact with the drum casing, and the edges of the shield 38 are provided with similar packing members 43, 44 (Figs. 1 and 2). Due to this construction the air enters the drum 20 only through the lowermost ports 32, which are normally covered with the ore, thus providing a restricted air supply, limited in quantity to that sufficient to produce lead oxid and avoid the formation of lead sulfate. This oxidation is accomplished at a temperature under the control of the heating element 33, so that undue rise in temperature which would tend to cause the ore to sinter or agglomerate is avoided. The heating element 33 introduces the desired quantity of heat into the ore by direct contact, by radiation and also by leading current through portions of the ore which have become sufficiently conductive to form short circuits from one coil to the next. The air is drawn in only as fast as sulfurous oxid is formed and carried away and as the air enters the fines or ore on the opposite side from that emitting the sulfurous oxid, which latter is heavier than air, it is apparent that the shield 38 plays an important part in the operation. Without this shield the heavier sulfurous oxid would displace the lighter air, so that the control of the chemical action taking place would be much more difficult. As the sulfurous oxid is continually withdrawn from contact with the ore as fast as it is formed, an additional condition tending to avoid the formation of sulfate is thus maintained. In this way the roasting to oxid may be carried on rapidly without fear of undue temperatures being generated, the chemical heat units being preferably not quite sufficient to balance the heat losses, the difference being made up by extraneous heat introduced in readily controlled quantity by means of the electrical heating element 33 to maintain the temperature at the desired point.

The sulfid ore having been roasted to oxid is discharged from drum 10, due to its rotation, by way of a spiral conveyer 45 provided in the discharge end of the drum and leading to an axially disposed outlet pipe or conduit 46. From this point it is passed into an electrically heated reduction furnace, together with sufficient quantity of carbon to combine with the oxygen content of the roasted product and leave the lead in metallic state.

The finely divided lead oxid and coke or charcoal are introduced into the feed hopper 50 of a reduction drum 51, which latter may have the usual sheet metal casing 52 and magnesite lining 53 and may be mounted to rotate as for example already described with reference to the roasting furnace. From the feed hopper 50, the lead oxid and carbon pass through inlet pipe 54 into the interior of the drum 51, and during the rotation of the latter the mixture is tumbled and thoroughly mixed together as it moves toward the discharge end of the drum, due to the inclination. Drum 51 has an electrical heating element in the form of a resister coil 55 embedded in the lining, this coil being electrically connected by slip rings 56—57 and conductors 58—59 with a dynamo 60 driven by internal combustion engine 61 of any approved type. The engine 61 is operated by gaseous fuel in the form of carbonic oxid derived from the reduction of lead oxid with carbon in the reduction furnace 51, as will be explained. The air is excluded from furnace 51, and the mixture of lead oxid and carbon in passing through the drum come in contact with the exposed inner face of the resister 55 and the temperature of the charge is raised by direct contact, by radiation of heat from the resister, and by the heating effects due to the passage of current through the charge which short circuits from one turn to the next of the resister. By suitably controlling the current supplied to resister 55, and by suitably regulating the rate at which the charge travels through the drum (as by varying the inclination of the drum) the temperature attained can be effectively controlled so as to perform the reducing operation while fusing the lead. The engine 61 operates as an exhaust pump for drawing off carbonic oxid from the drum as fast as it is formed, thus avoiding the formation of carbon dioxid. As the air is excluded from the drum 51 and the temperature and pressure are properly regulated the gas will be substantially pure carbonic oxid, which constitutes a highly advantageous fuel for the engine. The exhaust of gas from drum 51 occurs through pipes 62—63 and dust catcher 64. The reduced lead may be elevated through a spiral conveyer, as indicated in the roasting drum, and discharged from the drum through the pipe 62 and orifice 65. As the reduction of lead oxid by carbon represents a negative heat balance, it will be apparent that the temperature is at all times under control of the heating element 55.

The exhaust from engine 61 is delivered through pipe 66 to a preheater 67 for preheating the mixture of flux and carbon supplied to the reduction drum, in addition to the already heated lead oxid coming from the roasting furnace above described.

A comparison of the heat units involved in the various reactions indicates a total quantity of available heat sufficient to operate the entire system without outside power, but the invention does not preclude the use of electrical energy or heat from an outside source. By properly distributing or utilizing this heat, the burning of excess carbon as fuel by admitting air to the reduction apparatus is entirely avoided, thus at the same time simplifying the control of the chemical action.

I claim:

1. The method of roasting sulfid ores, which comprises drawing air through the charge of ore by suction action and at the same time continuously withdrawing the resultant sulfurous oxid gas to avoid formation of sulfate while agitating the charge.

2. The method of roasting sulfid ores, which comprises drawing air through the charge of ore by suction action and at the same time continuously withdrawing the resultant sulfurous oxid gas to avoid formation of sulfate, and supplying a regulated quantity of extraneous heat to maintain the desired temperature, while agitating the charge.

3. The method of roasting sulfid ores, which comprises drawing air through the charge of ore by suction action and at the same time continuously withdrawing the resultant sulfurous oxid gas to avoid formation of sulfate, and electrically generating in the locus of reaction a regulated quantity of extraneous heat to maintain the desired temperature, while agitating the charge.

4. The method of roasting sulfid ores, which comprises feeding the ore in the form of a relatively thin layer through a rotary drum, exhausting the interior space of the drum, and admitting air into the drum only through said layer of ore, while maintaining a reaction temperature.

5. Apparatus for roasting sulfid ores, comprising in combination a rotary drum, an inlet and outlet for the charge, air admitting passages extending through the drum wall, an exhaust pump for withdrawing gas from the interior of the drum, and a stationary shield closing all of said air admitting passages except where covered by the charge to be acted upon.

6. Apparatus for roasting sulfid ore, comprising in combination a rotary drum, an inlet and outlet for the charge, an electrical heating element in said drum, air admitting passages extending through the drum wall, an exhaust pump for withdrawing gas from the interior of the drum and a stationary shield closing all of said air admitting passages except where covered by the charge to be acted upon.

7. The method of roasting sulfid ores which comprises feeding the ore along one side of the interior of a drum or chamber, exhausting the interior space of said drum or chamber and admitting air only through said ore, while maintaining a reaction temperature inside said drum, 8. In an apparatus for roasting sulfid ores, the combination of an inclosed drum or chamber, an inlet and outlet for the charge, means for moving said charge from the inlet to the outlet, an exhauster for exhausting the interior space of said drum or chamber, apertures for admitting air through the walls of said drum or chamber and means for closing all of said air passages except those in that portion of the walls of the drum or chamber over which the said charge is passing.

9. A method of producing the metal of the ore from sulfid ores, comprising first reducing the sulfid to oxid in any desired manner and then reducing the oxid by carbon and heat with exclusion of air and at such temperature and pressure that carbon dioxid is substantially eliminated and the formation and removal of carbon monoxid is facilitated, burning said carbon monoxid to carbon dioxid, and using the available energy of the reaction to develop and supply heat for the reducing operation.

10. A method of producing the metal of the ore from sulfid ores comprising roasting the sulfid in a furnace constructed to draw air through the ore charge during the roasting, drawing off the resulting sulfur gases in concentrated form, transferring the resulting oxid ore to a reducing furnace with suitable addition of carbon, and reducing it while excluding air.

11. In a system of reducing sulfid ore, the combination of a roasting furnace constructed to suck out the sulfurous gas and draw air through the charge by the same action, a reducing furnace arranged to receive the resulting oxid ore from the roasting furnace with suitable additions of carbon from the outside, said reducing furnace being constructed to exclude air and maintain such temperature and pressure as will facilitate the production and removal of carbon monoxid.

12. A system of reducing sulfid ores comprising the combination of a roasting furnace constructed to suck out the sulfurous gas and draw air through the charge by the same action and having an electric heating element therein, a reducing furnace arranged to receive the resulting oxid ore from said roasting furnace with suitable additions of carbon from the outside, said reducing furnace being constructed to exclude air and having an electric heating element therein, means for regulating the temperature and pressure so as to facilitate the production and removal of carbon monoxid gas, a suitable gas engine, and an electric generator operatively connected to said gas engine and electrically connected to said heating elements in said furnace.

13. A furnace for roasting sulfid ores constructed to feed the charge along the inside wall of a drum or chamber and having openings or perforations in said wall in combination with exhausting mechanism constructed and arranged to suck out the sulfurous gas and draw air through the charge by the same action.

14. In a furnace for roasting sulfid ores, the combination of a drum or chamber having perforations or openings in its wall suitable for admitting air, means for feeding the ore charge along the interior face of said wall, an electric heating element in said drum, and exhausting mechanism constructed and arranged to suck out the sulfurous gas and draw air through the charge by the same action.

15. The method of roasting sulfid ores, which comprises drawing air through the charge of ore by suction action and at the same time continuously withdrawing the resultant sulfurous oxid gas to avoid formation of sulfate, and electrically generating in the locus of reaction partly by passage of current through the ore, a regulated quantity of extraneous heat to maintain the desired temperature, while agitating the charge.

GUYON F. GREENWOOD.